(12) United States Patent
Müller et al.

(10) Patent No.: US 7,244,812 B2
(45) Date of Patent: Jul. 17, 2007

(54) METHOD FOR THE PRODUCTION OF AQUEOUS POLYMER DISPERSIONS CONTAINING VERY FEW RESIDUAL MONOMERS AND USE THEREOF

(75) Inventors: Harmin Müller, Hofheim (DE); Martin Jakob, Kelkheim (DE); Carsten Heldmann, Schöneck (DE); Thomas Wirth, Stadecken-Elsheim (DE)

(73) Assignee: Celanese Emulsions GmbH, Kronberg/Ts. (DE)

( * ) Notice: Subject to any disclaimer, the term of this patent is extended or adjusted under 35 U.S.C. 154(b) by 9 days.

(21) Appl. No.: 10/527,178

(22) PCT Filed: Jul. 26, 2003

(86) PCT No.: PCT/EP03/08266

§ 371 (c)(1),
(2), (4) Date: Apr. 27, 2005

(87) PCT Pub. No.: WO2004/022609

PCT Pub. Date: Mar. 18, 2004

(65) Prior Publication Data

US 2005/0222374 A1 Oct. 6, 2005

(30) Foreign Application Priority Data

Sep. 7, 2002 (DE) ................................ 102 41 481

(51) Int. Cl.
*C08F 6/00* (2006.01)
(52) U.S. Cl. ...................... 528/480; 524/189; 524/247; 524/418; 524/458; 524/524
(58) Field of Classification Search ................ 524/189, 524/247, 418, 458, 524; 528/480
See application file for complete search history.

(56) References Cited

U.S. PATENT DOCUMENTS 3,692,726 A * 9/1972 Oehmichen ................. 524/189

| | | | |
|---|---|---|---|
| 5,087,676 A | 2/1992 | Heider et al. |
| 5,744,418 A | 4/1998 | Jakob |
| 5,886,140 A | 3/1999 | Olivares et al. |
| 6,211,400 B1 | 4/2001 | Berghofer et al. |
| 6,433,132 B1 | 8/2002 | Wood et al. |
| 6,639,048 B1 | 10/2003 | Wood et al. |

FOREIGN PATENT DOCUMENTS

| | | |
|---|---|---|
| DE | 195 45 609 | 6/1997 |
| DE | 197 41 188 | 3/1999 |
| DE | 197 43 759 | 4/1999 |
| DE | 198 05 122 | 4/1999 |
| DE | 198 39 199 | 3/2000 |
| DE | 199 42 776 | 3/2001 |
| EP | 1 199 315 | 4/2002 |
| EP | 1 199 316 | 4/2002 |
| EP | 1 201 685 | 5/2002 |
| WO | WO-00/22003 | 4/2000 |

* cited by examiner

*Primary Examiner*—Terressa Boykin
(74) *Attorney, Agent, or Firm*—Connolly Bove Lodge & Hutz LLP

(57) ABSTRACT

The invention relates to a method for reducing the amount of residual monomers in aqueous polymer dispersions means of chemical post-treatment. Post-treatment in the aqueous polymer dispersion is carried out by adding a redox system which contains a) 0.005-5 wt. % of an oxidation agent which contains an organic peroxide. and b) 0.005-5 wt. % of a reduction agent which contains sulfinic acids or salts thereof. Additionally the redox system can, optionally, contain catalytic amounts of a polyvalent metallic ion which can be treated in several valent stages. Post-treatment can be carried out at a temperature ranging from 20-100.degree. C. and at a PH-value ranging from 2-9. The invention also relates to the use of the inventive post-treated polymer dispersion for producing adhesives, coatings, powders, constructive chemical products or for refining textiles or paper.

24 Claims, No Drawings

METHOD FOR THE PRODUCTION OF AQUEOUS POLYMER DISPERSIONS CONTAINING VERY FEW RESIDUAL MONOMERS AND USE THEREOF

RELATED APPLICATIONS

This application is a national stage application (under 35 U.S.C. 371) of PCT/EP2003/008266 filed Jul. 26, 2003 which claims benefit to German application 102 41 481.5 filed Sep. 7, 2002.

The invention relates to a process for reducing the amount of residual monomers in aqueous polymer dispersions by chemical aftertreatment.

After their preparation by free radical emulsion polymerization or copolymerization, aqueous polymer dispersions, in addition to having a polymer solids content of from 30 to 75% by weight, also contain an undesired proportion of unpolymerized free monomers ("residual monomers") and may contain further volatile nonaqueous components, owing to the incomplete polymerization of the monomers used in the free radical main polymerization, which is generally carried out to a monomer conversion of 95 and preferably from 98 to 99% by weight. For ecological reasons, in the case of adhesive, coating and building products, the market requires the provision of aqueous polymer systems which have as low a content as possible of residual monomers, which contributes to the total VOC content of the dispersion (VOC=volatile organic compounds), in combination with the same processing and application properties.

In the case of physical methods, such as, for example, "stripping", in which gaseous nitrogen is passed through the dispersion, or, for example, steam distillation, there is the danger of the formation of coagulum and deposits. Moreover, these methods are often associated with a considerable time consumption and costs and are therefore uneconomical. In addition, particularly dispersions having a relatively high viscosity are known to be very difficult to demonomerize physically.

In addition to physical methods, various chemical methods for reducing residual monomer contents of aqueous polymer dispersions are available. These often include a stage downstream of the actual emulsion polymerization, by means of special redox initiator systems. A disadvantage known to a person skilled in the art is the decrease in viscosity which is associated with the chemical demonomerization, especially in the case of highly viscous dispersions, which decrease is often undesired.

Systems for chemical demonomerization are to be found in the patent literature.

Thus, for example, DE-A 198 39 199 discloses the reduction of the amount of residual monomers in aqueous polymer dispersions by aftertreatment with a hydroperoxide and/or a compound liberating hydrogen peroxide, an aldehyde $R^2CHO$ (e.g. acetaldehyde) in combination with an inorganic dithionite (e.g. sodium dithionite) and catalytic amounts of a polyvalent metal ion, e.g. salts of $Fe^{2+}$. In the redox system, hydrogen peroxide is preferably used as the oxidizing agent, but also potassium peroxide, sodium peroxide, and further precursors forming hydrogen peroxide in an aqueous medium. The use of organic hydroperoxides is also mentioned.

DE-A 199 42 776 of the same Applicant describes a process for reducing the residual monomer content in aqueous dispersions by aftertreatment with a hydroperoxide or a compound liberating hydrogen peroxide and a carbonyl compound ($R^2(C=O)R^3$ in which $R^2$=H, alkyl, etc. and $R^3$=—$CO_2M$, $SO_3M$, etc.) in combination with an inorganic dithionite and catalytic amounts of a polyvalent metal ion, e.g. salts of $Fe^{2+}$.

DE-A 197 43 759 presents the preparation and use of a novel class of sulfinic acid derivatives. They have the following structure: MO—SO—$CR^1R^2R^3$ in which M=Na, K, $NH_4$, Mg, Ca, Zn, $R^1$=OH, $NH_2$, $R^2$=COOM, COOR, $CONR_2$, $R^3$=H, alkyl, alkenyl, cycloalkyl, aryl. The use of the sulfinic acid derivatives as a cocatalyst in the emulsion polymerization is claimed. The object of this use is to provide sulfinic acid derivatives whose chemical properties are as similar as possible to those of the formaldehyde sulfoxylates, which however eliminate no formaldehyde during and after use. This publication provides no indications that very low residual monomer contents are to be expected with the reducing agents according to the invention when used in a redox aftertreatment.

Research Disclosure 1983/November 2000 (439062) presents sulfinic acid derivatives for emulsion polymerization and especially for the aftertreatment for reducing the residual monomer contents. These reducing agents are proposed for providing formaldehyde-free dispersions which have little discoloration. They have the following structure: MO—SO—$CR^1R^2R^3$ in which M=Na, K, $NH_4$, Mg, Ca, Zn, $R^1$=OH, $NH_2$, $R^2$=COOM, COOR, $CONR_2$, $R^3$=H, alkyl, alkenyl, cycloalkyl, aryl. Oxidation components recommended are hydrogen peroxide, persulfate, tert-butyl hydroperoxide or di-tert-butyl peroxide or combinations thereof. In addition, a metal salt (Fe, etc.) is used as a catalyst. Peresters, perketals and percarbonates are not mentioned.

EP-A-1 201 685 describes the use of a redox initiator system for the preparation of dispersions having a low formaldehyde content, containing copolymers of vinyl acetate and N-methylolacrylamide. As reducing agents are compounds of the structure MO(SO)—$CR^1R^2R^3$ in which M=H, $NH_4$, monovalent metal ion, $R^1$=OH or $NR^4R^5$, in which $R^4$ and $R^5$ are each H or $C_1$-$C_6$-alkyl, $R^2$=H, alkyl, alkenyl, cycloalkyl, aryl, $R^3$=$CO_2M$. There are no indications of low residual monomer contents with the use of the reducing agents according to the invention when employed in a redox aftertreatment.

EP-A-1 199 315 describes the use of a redox system for the preparation and aftertreatment of polymer dispersions comprising a mixture of a water-soluble and a water-insoluble oxidation component and a sulfinic acid or a salt thereof. The examples teach that the sole use of a water-insoluble oxidizing agent in combination with the sulfinic acid derivative (Comp. Ex. B) leads to poorer residual monomer and VOC contents.

EP-A-1 199 316 describes the use of a non-formaldehyde-forming free radical redox initiator system for the preparation and aftertreatment of polymer dispersions, which system comprises tert-alkyl hydroperoxide, tert-alkyl peroxide or tert-alkyl perester, the tert-alkyl group having at least 5 carbon atoms, and a "non-formaldehyde-liberating" reduction component, such as isoascorbic acid, sodium metabisulfite, sodium bisulfite, sodium dithionite and sodium 2-hydroxy-2-sulfinatoacetate. The advantageous effect with regard to the formaldehyde content arises from the use of tert-alkyl peresters as oxidizing agents which contain tert-amyl instead of tert-butyl groups as the alkyl group.

Advantageous effects regarding the particular efficiency of the residual monomer reduction with the mentioned combinations of oxidation and reduction components are not disclosed. In addition, the raw material costs for oxidizing agents containing tert-amyl groups are substantially higher than those of the corresponding tert-butyl compounds.

WO 00/22003 describes a process for emulsion polymerization in which a polymerization initiator which is not a hydroperoxide is combined with a reducing agent in order to achieve a reduction of the duration of the process in an initial cold start-temperature process. Reducing agents such as sodium formaldehyde sulfoxylate, ascorbic acid, sodium bisulfite, sodium metabisulfite and sodium dithionite are used. In addition, sugar and aldehydes, such as glutaraldehyde, are also recommended as reduction components. The particularly preferred reducing agent is sodium formaldehyde sulfoxylate. There are no indications regarding freedom from formaldehyde, tendency to discoloration (use of ascorbic acid) or a particular efficiency of the residual monomer reduction with the mentioned combinations of oxidation and reduction components. However, this process is not the aftertreatment of a prepared polymer dispersion but the use of the redox system as an initiator for initiating the emulsion polymerization.

U.S. Pat. No. 5,886,140 describes a process for reducing the residual monomer content in aqueous dispersions by chemical aftertreatment with a redox system, the reducing agents used being complexes of zinc sulfoxylate and formol (formalin), reducing sugars or acid derivatives thereof and $C_5$-$C_4$-carboxylic acids. Oxidation components used are hydroperoxides, peroxides, peroxydicarbonates or peroxyesters and selected mixtures of these components with inorganic persulfates. The use of formaldehyde-free sulfinic acid derivatives as reducing agents is not mentioned.

None of the publications cited indicates that dispersions exhibiting little yellowing in combination with particularly low residual monomer contents are obtainable with the redox systems described there, by means of redox agents which lead to no additional introduction of formaldehyde into the dispersion. In particular, there is no information regarding the suitability of redox systems described for the demonomerization of dispersions having a relatively high viscosity.

It was therefore the object of the present invention to provide a novel and effective process for the particularly efficient reduction of residual monomer contents in aqueous polymer dispersions, it being intended to minimize the known disadvantages associated therewith, such as yellowing, formaldehyde introduction by the aftertreatment and the formation of coagulum. Moreover, the invention should be easy to use industrially and should also be capable of being applied to dispersions having a relatively high viscosity without a serious decrease in viscosity.

It was surprising that this object is achieved by a process for reducing the amount of residual monomers in aqueous polymer dispersions, in which an aftertreatment of the aqueous polymer dispersions containing residual monomers is carried out with addition of a redox system which comprises a) from 0.005 to 5% by weight, based on the total weight of all monomers used for the preparation of the polymer dispersion, of at least one oxidizing agent based on an organic peroxide from the class consisting of the a1) peresters, characterized by the structure $$R^1\text{—}CO\text{—}O\text{—}O\text{—}R^2, \quad (1a)$$

in which $R^1$, $R^2$=alkyl, aryl, cycloalkyl, aralkyl, $R^3CO$, $R^3OCO$ in which $R^3$=alkyl, aralkyl, aryl and the substituted variants thereof and/or a2) percarbonates, characterized by the structure $$R^4\text{—}O\text{—}CO\text{—}O\text{—}O\text{—}R^5, \quad (1b)$$

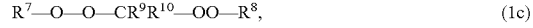

in which $R^4$, $R^5$=alkyl, aryl, cycloalkyl, aralkyl, $R^6CO$, $R^6OCO$ in which $R^6$=alkyl, aralkyl, aryl and the substituted variants thereof, it being possible for the radicals $R^4$, $R^5$ and $R^6$ themselves to contain percarbonates, and/or a3) perketals, having the following structure:

$$R^7\text{—}O\text{—}O\text{—}CR^9R^{10}\text{—}OO\text{—}R^8, \quad (1c)$$

in which $R^9$, $R^{10}$=H or alkyl and $R^7$, $R^8$=alkyl, aryl, cycloalkyl, aralkyl, $R^{11}CO$, $R^{11}OCO$ in which $R^{11}$=alkyl, aralkyl, aryl and the substituted variants thereof, and b) from 0.005 to 5% by weight, based on the total weight of all monomers used for the preparation of the polymer dispersion, of at least one reducing agent from the group consisting of the sulfinic acids and the salts thereof having the structure $$MO\text{—}SO\text{—}CR^{12}R^{13}R^{14} \quad (2)$$

in which M=H, $NH_4$, a monovalent metal ion or one equivalent of a divalent metal ion of groups Ia, IIa, IIb, IVa or VIIIb of the Periodic Table of the Elements, in which $R^{12}$=OH, $NR^{15}R^{16}$ in which $R^{15}$, $R^{16}$=H or $C_1$-$C_6$-alkyl, in which $R^{13}$=H, an alkyl, alkenyl, cycloalkyl or aryl group, it being possible for these groups to have 1, 2 or 3 substituents which, independently of one another, are selected from $C_1$-$C_6$-alkyl, OH, O—$C_1$-$C_6$-alkyl, halogen and $CF_3$, in which $R^{14}$=COOM, $SO_3M$, $COR^{15}$, $CONR^{15}R^{16}$, $COOR^{15}$, in which M, $R^{15}$ and $R^{16}$ have the abovementioned meanings, or, if $R^{13}$ is aryl, this may be unsubstituted or substituted as stated above, and $R^{14}$ is also H, and the salts thereof.

If, in the components a1), a2) and a3), any radicals are alkyl, this is a straight-chain or branched alkyl group which preferably has from 1 to 22, in particular from 1 to 18, carbon atoms. The alkyl group may be unsubstituted or substituted.

If, in the components a1), a2) and a3), any radicals are cycloalkyl, this is a cycloalkyl group having three to eight ring carbon atoms, preferably five to six ring carbon atoms. The cycloalkyl group can likewise be unsubstituted or substituted.

If, in the components a1), a2) and a3), any radicals are aryl, this is a mononuclear or polynuclear aromatic radical which typically has five to fourteen, preferably six to ten, ring carbon atoms, in particular phenyl or naphthyl. The aryl group can likewise be unsubstituted or substituted.

If, in the components a1), a2) and a3), any radicals are aralkyl, this is an aromatic-aliphatic radial which typically has five to fourteen, preferably six to ten, ring carbon atoms and is linked to the remainder of the molecule via an alkyl group, in particular benzyl. The aralkyl groups can likewise be substituted or unsubstituted.

Examples of possible substituents of these radicals are monovalent organic radicals, such as alkyl, cycloalkyl, aryl, aralkyl, alkoxy, aryloxy, hydroxyl, amino, N-alkylamino, N,N-dialkylamino or halogen atoms.

In addition, the redox system can, if required, also contain catalytic amounts of a polyvalent metal ion which may occur in a plurality of valency states.

The oxidizing agent of the redox system for the process according to the invention should be capable of forming free radicals. In the redox system, preferably the a1) peresters are used. Particularly preferably, tert-butyl perbenzoate, tert-butyl peroxy-3,5,5-trimethylhexanoate and tert-butyl peroxy-2-ethylhexanoate, very particularly preferably tert-butyl perbenzoate are used as oxidizing agents, but also cumyl peroxyneodecanoate, 1,1,3,3-tetramethylbutyl peroxyneodecanoate, tert-butyl peroxyneodecanoate, 1,1,3,3-tetramethylbutyl peroxypivalate, tert-butyl peroxyneoheptanoate, tert-amyl peroxypivalate, tert-butyl peroxypivalate, 1,1,3,3-tetramethylbutylperoxy-2-ethylhexanoate, tert-amyl peroxy-2-ethylhexanoate, tert-butyl peroxydiethylacetate, tert-butyl peroxyisobutyrate, tert-butyl peroxyacetate and tert-amyl peroxybenzoate, or the a2) percarbonates 1-(2-ethylhexanoylperoxy)-1,3-dimethylbutyl peroxypivalate, di(2-ethylhexyl)peroxydicarbonate, 2,5-dimethyl-2,5-di(2-ethylhexanoylperoxy)hexane, tert-amylperoxy 2-ethylhexyl carbonate, tert-butylperoxy isopropyl carbonate and tert-butylperoxy 2-ethylhexyl carbonate, or the a3) perketals 1,1-di(tert-butylperoxy)-3,3,5-trimethylcyclohexane, 2,2-di(4,4-di(tert-butylperoxy)cyclohexyl)propane, 1,1-di(tert-butylperoxy)cyclohexane, 2,2-di(tert-butylperoxy)butane, 3,6,9-triethyl-3,6,9-trimethyl-1,4,7-triperoxonane can be used.

However, it is also possible to use mixtures of different oxidizing agents. In industrial operation, it is of course possible to use the hydrophobic peroxide components, for reasons of process safety, in the form of an aqueous emulsion which is stabilized with surface-active substances or polymeric stabilizers.

The amount of oxidizing agent added is usually in the range of from 0.005 to 5% by weight, preferably from 0.02 to 3% by weight, particularly preferably from 0.02 to 2% by weight, very particularly preferably from 0.05 to 1% by weight, in particular from 0.05 to 0.5% by weight, based on the total weight of all monomers.

The reducing agent of the redox system for the process according to the invention is described under b). In the description and the claims of the present Application, the expressions mentioned below with regard to the radicals for the reduction component (2) have the following meanings:

Alkyl in the compounds of component b) is a straight-chain or branched alkyl group which preferably has 1 to 6, in particular 1 to 4, carbon atoms. Examples of alkyl groups are methyl, ethyl, n-propyl, isopropyl, n-butyl, tert-butyl, n-hexyl, etc. The same applies to the alkyl groups in O-alkyl.

Alkenyl in the compounds of component b) is a straight-chain or branched alkenyl group which preferably has 3 to 8 carbon atoms, in particular 3 to 6 carbon atoms. A preferred alkenyl group is, for example, the allyl group.

Cycloalkyl in the compounds of component b) is in particular $C_3$-$C_6$-cycloalkyl, cyclopentyl and cyclohexyl being particularly preferred.

Aryl in the compounds of the component b) (also in aralkyl) is preferably phenyl or naphthyl. If the aryl radical is a phenyl group and is substituted, it preferably has two substituents. These are present in particular in the 2- and/or 4-position.

Halogen is F, Cl, Br and I, preferably Cl and Br.

M is preferably an ammonium or alkali metal ion or one equivalent of an alkaline earth metal or zinc ion.

Suitable alkali metal ions are in particular sodium or potassium ions, and suitable alkaline earth metal ions are especially magnesium and calcium ions.

$R^{12}$ is preferably a hydroxyl or amino group.

$R^{13}$ is preferably a hydrogen atom or an alkyl or aryl group which may be substituted as above. It preferably has one or two hydroxyl and/or alkoxy substituents.

$R^{14}$ is preferably either COOM or COOR$^{15}$ (M and R$^{15}$ have the abovementioned meanings) or, if $R^{13}$ is aryl which may be substituted as stated above, also a hydrogen atom.

A preferred embodiment comprises compounds of the formula (2) in which

M is an alkali metal ion or one equivalent of an alkaline earth metal or zinc ion;

$R^{12}$ is a hydroxyl or amino group;

$R^{13}$ is H or alkyl; and $R^{14}$ is COOM or COOR$^{15}$, in which M is H, an alkali metal ion or one equivalent of an alkaline earth metal ion and $R^{15}$ is $C_1$-$C_6$-alkyl.

A further preferred embodiment comprises compounds of the formula (2) in which

M is an alkali metal ion or one equivalent of an alkaline earth metal or zinc ion;

$R^{12}$ is a hydroxyl or amino group;

$R^{13}$ is aryl which is unsubstituted or substituted as stated above, in particular hydroxyphenyl or $C_1$-$C_4$-alkoxyphenyl; and $R^{14}$ is a hydrogen atom.

Examples of such compounds are:

2-hydroxyphenylhydroxymethylsulfinic acid or the sodium salt thereof, 4-methoxyphenylhydroxymethylsulfinic acid or the sodium salt thereof, 2-hydroxy-2-sulfinatoacetic acid or the disodium or zinc salt thereof and 2-hydroxy-2-sulfinatopropionic acid or the disodium salt thereof.

The compounds described above can be used as a pure substance or in the form of technical-grade mixtures. These include, for example, mixtures of the abovementioned sulfinic acid derivatives with, for example, sodium sulfite and/or sulfonic acid derivatives which cannot eliminate any formaldehyde, such as ®Brüggolit FF06 from Brüggemann. The use of these compounds is particularly preferred. ®Brüggolit FF06 corresponds to disodium 2-hydroxy-2-sulfinatoacetate or a mixture of disodium 2-hydroxy-2-sulfinatoacetate with sodium sulfite and disodium 2-hydroxy-2-sulfonatoacetate. A particularly suitable mixing ratio is: disodium 2-hydroxy-2-sulfinatoacetate in an amount of from 50 to 60% by weight, sodium sulfite in an amount of from 30 to 35% by weight and disodium 2-hydroxy-2-sulfonatoacetate in an amount of from 10 to 15% by weight, based on the total weight of the mixture. However, other mixing ratios are also possible in principle.

The amount of reducing agent added is usually in the range from 0.005 to 5% by weight, preferably from 0.02 to 3% by weight, particularly preferably from 0.02 to 2% by weight, very particularly preferably from 0.05 to 1% by weight, in particular from 0.05 to 0.5% by weight, based on the total weight of all monomers. Larger amounts of reducing agent are also possible but are economically less expedient.

The advantageous metal compounds which can be used for the aftertreatment are usually completely soluble in the aqueous medium of the polymer dispersion and the metallic components thereof may also be capable of being present in a plurality of valency states. The dissolved metal ions have a catalytic action and promote the electron transfer reactions between the oxidizing and reducing agents which are actually effective. Suitable dissolved metal ions are in principle iron, copper, manganese, vanadium, nickel, cobalt, titanium, cerium or chromium ions. Of course, it is also possible to use mixtures of different metal ions which do not interfere, such as, for example, the system $Fe^{2/3+}/VSO_4^-$. Iron ions are preferably used.

The dissolved metal ions are, if required, used in catalytic amounts in the range from 1 to 1000, preferably from 5 to 500, particularly preferably from 10 to 120, ppm, based on the total weight of all monomers.

The process according to the invention is particularly suitable for reducing the amount of residual monomers in aqueous polymer dispersions which are obtainable by free radical emulsion polymerization of monomers having at least one ethylenically unsaturated group.

Monomers having at least one monoethylenically unsaturated group which are suitable for the process according to the invention include in particular monomers which can be subjected to free radical polymerization in a simple manner, such as, for example, aromatic or aliphatic α,β-unsaturated, unsubstituted or halogen-substituted hydrocarbons (ethene, propene, 1-butene, 2-butene, vinyl chloride, vinylidene chloride, styrene, α-methylstyrene or o-chlorostyrene, ethene and styrene being preferred), or esters of vinyl alcohol and monocarboxylic acids having 1 to 18 carbon atoms, such as vinyl acetate, vinyl propionate, vinyl n-butyrate, vinyl laurate, vinyl stearate and vinyl versatate, esters of α,β-monoethylenically unsaturated mono- and dicarboxylic acids preferably having from 3 to 6 carbon atoms, such as, in particular, acrylic acid, methacrylic acid, maleic acid, fumaric acid and itaconic acid, alkanols having in general from 1 to 12, preferably from 1 to 8 and in particular from 1 to 4 carbon atoms, such as, in particular, methyl, ethyl, n-butyl, isobutyl and 2-ethylhexyl acrylate and methacrylate, dimethyl maleate or di-n-butyl maleate, and nitriles of α,β-monoethylenically unsaturated carboxylic acids, such as acrylonitrile, and conjugated $C_{4-8}$-dienes, such as 1,3-butadiene and isoprene. In the case of aqueous polymer dispersions produced exclusively by the method of free radical aqueous emulsion polymerization, said monomers are as a rule the main monomers which together usually account for an amount of more than 50% by weight, based on the total amount of the monomers to be polymerized by the free radical aqueous emulsion polymerization process. As a rule, these monomers have only moderate to slight solubility in water under standard conditions (25° C., 1 atm).

Monomers which have a high water solubility under the abovementioned conditions are, for example, α,β-monoethylenically unsaturated mono- and dicarboxylic acids and the amides thereof, such as, for example, acrylic acid, methacrylic acid, maleic acid, fumaric acid, itaconic acid, acrylamide and methacrylamide, and furthermore vinylsulfonic acid and the water-soluble salts thereof and N-vinylpyrrolidone.

In the case of aqueous polymer dispersions produced exclusively by the method of free radical aqueous emulsion polymerization, the abovementioned monomers having high water solubility are usually incorporated by polymerization only as modifying monomers in amounts of less than 50% by weight, as a rule from 0.5 to 20, preferably from 1 to 10% by weight, based on the total amount of the monomers to be polymerized.

Monomers which usually increase the internal strength of the films of the aqueous polymer dispersions usually have at least one epoxy, hydroxyl, N-methylol or carbonyl group, or at least two nonconjugated ethylenically unsaturated double bonds. Examples of these are N-alkylolamides of α,β-monoethylenically unsaturated carboxylic acids having from 3 to 10 carbon atoms, among which N-methylolacrylamide and N-methylolmethacrylamide are very particularly preferred, and the esters thereof with alkanols having from 1 to 4 carbon atoms. In addition, monomers having two vinyl radicals, monomers having two vinylidene radicals and monomers having two alkenyl radicals are also suitable. The diesters of dihydric alcohols with α,β-monoethylenically unsaturated monocarboxylic acids are particularly advantageous, among which acrylic and methacrylic acid are preferred. Examples of such monomers having two nonconjugated ethylenically unsaturated double bonds are alkylene glycol diacrylates and dimethacrylates, such as ethylene glycol diacrylate, 1,2-propylene glycol diacrylate, 1,3-propyleneglycol diacrylate, 1,3-butylene glycol diacrylate, 1,4-butylene glycol diacrylates and ethylene glycol dimethacrylate, 1,2-propylene glycol dimethacrylate, 1,3-propylene glycol dimethacrylate, 1,3-butylene glycol dimethacrylate and 1,4-butylene glycol dimethacrylates, and divinylbenzene, vinyl methacrylate, vinyl acrylate, allyl methacrylate, allyl acrylate, diallyl maleate, diallyl fumarate, methylenebisacrylamide, cyclopentadienyl acrylate or triallyl cyanurate. In this context, the $C_1$-$C_9$-hydroxyalkyl methacrylates and acrylates, such as n-hydroxyethyl, n-hydroxypropyl or n-hydroxybutyl acrylate and methacrylate, and compounds such as diacetoneacrylamide and acetylacetoxyethyl acrylate and methacrylate are also of particular importance. Moreover, it is also possible organosilicon monomers of the general formula $RSi(CH_3)_{0-2}(OR^1)_{3-1}$, in which R has the meaning $CH_2=CR^2-(CH_2)_{0-1}$ or $CH_2=CR^2CO_2-(CH_2)_{1-3}$, $R^1$ is a straight-chain or branched, unsubstituted or substituted alkyl radical having 3 to 12 carbon atoms, which may be interrupted by an ether group, and $R^2$ is H or $CH_3$. Examples of these are vinylmethyldimethoxysilane, vinylmethyidiethoxysilane, vinylmethyldi-n-propoxysilane, vinylmethyldiisopropoxysilane, vinylmethyldi-n-butoxysilane, vinylmethyldi-sec-butoxysilane, vinylmethyldi-tert-butoxysilane, vinylmethyldi(2-methoxyisopropoxy)silane and vinylmethyldioctyloxysilane. In the case of aqueous polymer dispersions produced exclusively by the method of free radical aqueous emulsion polymerization, the abovementioned monomers are incorporated by polymerization in general in amounts of from 0.5 to 10% by weight, based on the total amount of the monomers to be polymerized.

The components of the redox system used for the process according to the invention are expediently added simultaneously or in succession for the aftertreatment of the polymer dispersion heated to a temperature in the range from about 20 to 100° C., preferably from 25 to 90° C., particularly preferably from 30 to 85° C., preferably under atmospheric pressure, but, if required, also at a pressure greater than or less than 1 bar (absolute), while stirring. The redox system components according to the invention can be metered either after the end of the polymerization or added in the form of one or more portions. The time for the metering, the addition of one more portions and the time between the additions depend on the chemical composition of the dispersion, the size of the reaction batch, the reactor geometry and the half-life of the redox system used. Depending on the object, the duration of the addition of the redox system may be from a few seconds to several hours. It has proven expedient to determine the duration in preliminary experiments. The sequence in the addition/metering/portion-by-portion addition of the oxidizing agent and reducing agent is expediently determined in preliminary experiments, all combinations being permissible in the process according to the invention. In a preferred embodiment, the oxidizing agent is added first and then the reducing agent is added.

The metering can be effected from above, from below or from the side. Particularly preferably, at least one component is either metered or added in portions. Very particularly preferably, the reducing agent is metered.

The metal salt solution can be added at various times during the redox aftertreatment. The embodiment in which the reducing agent already contains the metal salt is preferred.

The aftertreatment according to the invention is usually carried out at a pH in the range of less than or equal to 9. In principle, bases, such as, for example, sodium hydroxide solution, ammonia water or triethanolamine, can be used for adjusting the pH of the polymer dispersion. A pH range of from 2 to 9 is advantageous for the aftertreatment of the polymer dispersion, and a pH in the range between 3 and 9 is preferred according to the invention.

Dispersions having viscosities of >100 mPa·s are advantageous for the process according to the invention, preferably dispersions of >1000 mPa·s, particularly preferably dispersions of >2000 mPa·s, very particularly preferably dispersions of >5000 mPa·s, without a significant decrease in viscosity taking place. The preparation of aqueous polymer dispersions has frequently been described in the past and is therefore known to a person skilled in the art [cf. e.g. Encyclopedia of Polymer Science and Engineering, Vol. 8, page 659 et seq. (1987)]. It is effected by emulsion polymerization of monomers having at least one olefinically unsaturated group in the presence of a preferably water-soluble polymerization initiator and in the presence of emulsifiers and, if required, protective colloids and customary further additives. As a rule, the addition of the monomers by continuous feed is effected here. The use of peroxodisulfuric acid and/or the salts thereof in amounts of from 0.1 to 2% by weight, based on the total amount of monomers, as initiator is preferred. The polymerization temperature is in general from 20 to 150 and preferably from 60 to 120° C. The polymerization takes place, if required, under pressure. In particular, anionic emulsifiers alone or as a mixture with nonionic dispersants in an amount of, in particular, from 0.5 to 6% by weight of the total amount of monomers are used as emulsifiers.

The aftertreatment, according to the invention, of the aqueous polymer dispersion for reducing the amount of residual monomers is effected in particular after at least 95% and preferably at least 98 to 99% by weight of the total amount of monomers in the free radical emulsion polymerization have reacted.

Of course, it is possible to subject the aqueous polymer dispersions intended for the aftertreatment to a physical process (e.g. inert gas and/or steam stripping) beforehand, simultaneously or afterwards. The free radical redox systems to be used according to the invention permit an effective reduction of the amount of residual monomers in a relatively short time.

The dispersions aftertreated with the redox system according to the invention have, in an outstanding manner, particularly low residual monomer and formaldehyde contents. In addition, they have no tendency to undergo yellowing.

The dispersions aftertreated with the redox system according to the invention are therefore particularly suitable for the preparation of coating materials (inter alia paints, food coatings), adhesives (wood, paper, plastics films) and products for construction chemistry and for the finishing of textiles and paper. The dispersions according to the invention can also advantageously be converted by spray-drying into powders having low VOC contents, which are used in products for construction chemistry and adhesives.

EXAMPLES

Preparation of the Base Dispersion for Example 1:

A solution of 400 g of partly hydrolyzed polyvinyl alcohol having a degree of hydrolysis of 88 mol % (polyvinyl alcohol having a viscosity of 18 mPa·s as a 4% strength aqueous solution) in 3510 g of demineralized water was prepared in a 10 l glass stirred vessel reactor having an anchor stirrer, which was provided with feed facilities, reflux condenser, jacket heating and jacket cooling and a nitrogen connection. After the addition of 5.5 g of anhydrous sodium acetate and of 3.5 g of antifoam (®Agitan 280, Münzing-Chemie) and flushing with nitrogen, 0.17 g of ®Rongalit in 12.8 g of water was added during the heating-up. At an internal temperature of 57° C., 350 g of vinyl acetate were incorporated by emulsification. The internal temperature was increased to 60° C. and the polymerization was initiated by adding a solution of 0.16 g of tert-butyl hydroperoxide (70% strength, ®Trigonox AW 70, Akzo-Chemie) and 12.8 g of water. At an internal temperature of 67° C., the 3 hour linear and simultaneous metering of 3650 g of vinyl acetate, an initiator solution 1 comprising 1.45 g of tert-butyl hydroperoxide (70% strength, ®Trigonox AW 70, Akzo-Chemie) and 199 g of water and an initiator solution 2 comprising 1.54 g of ®Rongalit C and 167 g of water was started. The jacket temperature was chosen so that, on gentle refluxing, the internal temperature increased to 80° C. and remained constant there during the entire metering time. After the end of the metering time, heating was continued for a period of one hour at 80° C. The dispersion was then cooled and was used for all further aftertreatment experiments. The solids content was 52.5% and the viscosity 45000 mPa·s (Brookfield, spindle 6, 20 rpm, 23° C.). The residual monomer content of vinyl acetate was 7300 ppm.

Carrying Out the Aftertreatment:

Oxidizing agent a), reducing agent b) and, if required, Mohr's salt solution were added to 1000 g of the dispersion in a 2 l round-bottomed flask at a temperature of 60° C. at intervals of 10 min. After the addition of the last component, heating was continued over a period of 45 min and the reaction was stopped with 1 ml of a 1% strength methyl ether hydroquinone solution in methanol. The batches were then cooled. The blank sample V1i was subjected to the same heating sequence, including the dilution with water by subsequent additions of redox system, but without subsequent additions of redox systems.

The results are listed in the table below.

Example 1 with Comparative Examples

TABLE 1a

Amounts of substances in the aftertreatment

| Example | Oxidizing agent | Weight of ox. taken g/1000 g disp. | Amount of ox. mmol | Reducing agent | Weight of red. taken g/1000 g disp. in 13 g $H_2O$ | sulfinate mmol | Sulfonate mmol | Sodium sulfite mmol | Total mmol | Mohr's salt g (always 10 ppm) in 1.6 g $H_2O$ |
|---|---|---|---|---|---|---|---|---|---|---|
| 1 (acc. to the invention) | ®Trigonox C[1] | 1.00 | 5.15 | ®Brüggolit FF06 | 1.24 | 3.71 | 0.774 | 3.20 | 7.68 | 0.01 |
| V1a | ®Trigonox C | 1.00 | 5.15 | Glyoxylic acid/bisulfite adduct*2 Na salt[2] | 1.54 | | 7.697 | | 7.70 | 0.01 |
| V1b | ®Trigonox C | 1.00 | 5.15 | Sodium sulfite | 0.97 | | | 7.70 | 7.70 | 0.01 |
| V1c | ®Trigonox C | 1.00 | 5.15 | Glyoxylic acid/bisulfite adduct*2 Na salt + sodium sulfite[1] | 0.30 + 0.78 | | 1.490 | 6.20 | 7.69 | 0.01 |
| V1d | ®Trigonox C | 1.00 | 5.15 | Sodium sulfite | 0.97 | | | 7.70 | 7.70 | 0.01 |
| V1e | ®Trigonox AW 70[4] | 0.66 | 5.15 | ®Brüggolit FF06[3] | 1.24 | 3.71 | 0.774 | 3.20 | 7.68 | 0.01 |
| V1f | H2O2 | 0.58 | 5.15 | ®Brüggolit FF06 | 1.24 | 3.71 | 0.774 | 3.20 | 7.68 | 0.01 |
| 1b (acc. to the invention) | ®Trigonox C | 1.00 | 5.15 | ®Brüggolit FF06 | 1.24 | 3.71 | 0.774 | 3.20 | 7.68 | 0 |
| V1g | ®Trigonox C | 1.00 | 5.15 | Ascorbic acid | 1.36 | | | | 7.72 | 0.01 |
| V1h | ®Trigonox C | 1.00 | 5.15 | Ascorbic acid | 1.36 | | | | 7.72 | 0 |
| V1i | ®Trigonox C | 1.00 | 5.15 | ®Brüggolit C[5] | 0.57 | 3.71 | | | 3.71 | 0.01 |
| V1j | Starting dispersion | | | | | | | | | |
| V1k | ®Trigonox B[6] | 0.76 | 5.13 | ®Brüggolit FF06[3] | 1.24 | 3.71 | 0.774 | 3.20 | 7.68 | 0.01 |

V = Comparative examples
[1] ®Trigonox C from Akzo Nobel is the trade name for tert-butyl perbenzoate
[2] Preparation of glyoxylic acid bisulfite adduct*2 Na salt: T. M. Olson, M. R. Hoffmann, J. Phys. Chem. 1988, 92, 4246-4253
[3] ®Brüggolit FF06 from Brüggemann is the trade name for the technical-grade mixture of disodium 2-hydroxy-2-sulfinatoacetate in an amount of from 50 to 60% by weight, sodium sulfite in an amount of from 30 to 35% by weight and disodium 2-hydroxy-2-sulfonatoacetate in an amount of from 10 to 15% by weight, based on the total weight of the mixture.
[4] ®Trigonox AW 70 from Akzo Nobel is the trade name for tert-butyl hydroperoxide (70% strength in water).
[5] ®Brüggolit C from Brüggemann is the trade name for sodium formaldehyde sulfoxylate dihydrate
[6] ®Trigonox B from Akzo Nobel is the trade name for di-tert-butyl peroxide TABLE 1b Results of the aftertreatment

| Example | Oxidizing agent | Reducing agent | Mohr's salt | Test ppm vinyl acetate | Test ppm formaldehyde | Test Yellowing after 3 weeks | Viscosity mPa · s (Brookfield: spindle: 6 /20 rpm) | Decrease in viscosity [%] |
|---|---|---|---|---|---|---|---|---|
| 1 (acc. to the invention) | ®Trigonox C | ®Bruggolit FF 06 | yes | 600 | 20 | no | 33700 | −0.15 |
| V1a | ®Trigonox C | Glyoxylic acid/bisulfite adduct[1] Na salt | yes | 7000 | 21 | no | 33200 | −1.63 |
| V1b | ®Trigonox C | Sodium sulfite | yes | 7000 | 22 | no | 32550 | −3.56 |
| V1c | ®Trigonox C | Glyoxylic acid/bisulfite adduct*2 Na salt + sodium sulfite | yes | 7000 | 22 | no | 32450 | −3.85 |
| V1d | ®Trigonox C | Sodium sulfite | yes | 7300 | 22 | no | 30900 | −8.44 |
| V1e | ®Trigonox AW 70 | ®Brüggolit FF 06 | yes | 1200 | 12 | no | 29200 | −13.5 |
| V1f | H2O2 | ®Brüggolit FF 06 | yes | 5400 | 13 | no | 23150 | −31.4 |
| 1b (acc. to the invention) | ®Trigonox C | Brüggolit FF 06 | no | 500 | 14 | no | 34400 | +1.93 |
| V1g | ®Trigonox C | Ascorbic acid | yes | 700 | 34 | yes | 18950 | −43.9 |
| V1h | ®Trigonox C | Ascorbic acid | no | 1100 | 40 | yes | 19750 | −41.5 |
| V1i | ®Trigonox C | ®Brüggolit C | yes | 1200 | 59 | no | 28000 | −17.0 |

TABLE 1b-continued

Results of the aftertreatment

| Example | Oxidizing agent | Reducing agent | Mohr's salt | Test ppm vinyl acetate | Test ppm formaldehyde | Test Yellowing after 3 weeks | Viscosity mPa·s (Brookfield: spindle: 6 /20 rpm) | Decrease in viscosity [%] |
|---|---|---|---|---|---|---|---|---|
| V1j | Parallel blank test without redox treatment | | | 7000 | 40 | no | 33750 | Ref. |
| V1k | ®Trigonox B | ®Brüggolit FF06 | yes | 3800 | | | | |

V = Comparative examples

These examples show that, in comparison with comparative examples (V1a-V1d), the byproducts of ®Brüggolit FF06 (glyoxylic acid/bisulfite adduct*2 Na salt or sodium sulfite) which are not according to the invention have no significant effect by themselves.

Examples 1 and 1b according to the invention exhibit no marked decrease in viscosity compared with the blank test, which however occurs in comparative experiments V1e and in particular V1f when water-soluble oxidizing agents are used.

Conventional water-soluble oxidizing agents have no particular effect (>1000 ppm residual monomer content) and ascorbic acid as a reducing agent leads to substantial yellowing after 3 weeks.

Example 2 and Comparative Example V2

A dispersion based on vinyl acetate/ethylene, having a viscosity of 7000 mPa·s and a residual vinyl acetate content of 5100 ppm, was heated to a temperature of 60° C. In the aftertreatment, 0.14 part by weight, based on dispersion, of ®Trigonox C or ®Trigonox AW 70 (70% strength) (0.14 part by weight, based on dispersion) was added while stirring. After 10 minutes, 0.17 part by weight of ®Brüggolit FF06 was added by metering as a 5% strength aqueous solution. After a further 10 minutes, 0.004 part by weight of a 1% strength aqueous Mohr's salt solution was added.

TABLE 2

Amounts of residual monomers in the aqueous polymer dispersion before and after the aftertreatment according to the invention (example 2) in comparison with a hydroperoxide (®Trigonox AW 70, comparative example V2).

| | before aftertreatment [ppm] | after aftertreatment [ppm] | Viscosity change/% |
|---|---|---|---|
| Vinyl acetate (Trig. C) | 4700 | 70 | −5 Ex. 2 |
| Vinyl acetate (Trig. AW 70) | 4700 | 810 | −15 V2 |

Examples 3, 3b and Comparative Example V3

Ten kg of vinyl acetate/ethylene dispersion having a viscosity of 2500 mPa·s and a residual vinyl acetate content of 2000 ppm were heated to a temperature of 60° C. In the aftertreatment, 10 g of ®Trigonox C (0.10 part by weight, based on dispersion), 1.40 g of ®Trigonox 42S (tert-butyl peroxy-3,5,5-trimethylhexanoate) or 14.3 g of ®Trigonox AW 70 (70% strength) (0.10 part by weight, based on dispersion) were added while stirring. After 10 minutes, ®Brüggolit FF06 (200 g) was added as a 5% strength aqueous solution (0.10 part by weight, based on dispersion).

After a further 10 minutes, a 1% strength aqueous Mohr's salt solution (40 ml, 0.004 part by weight, based on dispersion) and 45 g of water were added.

TABLE 3

Amounts of residual monomers in the aqueous polymer dispersion before and after the aftertreatments 3, 3b according to the invention in comparison with a hydroxperoxide (®Trigonox AW 70, comparative example V3).

| | before aftertreatment [ppm] | after aftertreatment [ppm] | Viscosity change/% |
|---|---|---|---|
| Vinyl acetate (Trig. C) | 2000 | 85 Example 3 | −7.7 |
| Vinyl acetate (Trig. 42 S) | 2000 | 41 Example 3b | −3.2 |
| Vinyl acetate ($H_2O_2$) | 2000 | 900 Comp. example V3 | −25 |

Example 4 and Comparative Example V4

10 kg of vinyl acetate/acrylate/VeoVa 10 dispersion having a viscosity of 200 mPa·s and a residual vinyl acetate content of 600 ppm were heated to a temperature of 60° C. In the aftertreatment, 17.1 g of ®Trigonox C (0.17 part by weight, based on dispersion) or 24.4 g of ®Trigonox AW 70 (70% strength) (0.17 part by weight, based on dispersion) were added while stirring. After 10 minutes, ®Brüggolit FF06 (342 g) was added as a 5% strength aqueous solution (0.17 part by weight, based on dispersion). After a further 10 minutes, a 1% strength aqueous Mohr's salt solution (40 ml, 0.004 part by weight, based on dispersion) and 49 g of water were added.

TABLE 4

Amounts of residual monomers in the aqueous polymer dispersion before and after the aftertreatment according to the invention (example 4) in comparison with a hydroperoxide ®Trigonox AW 70, comparative example V4). The residual contents for ®VeoVa10 and the acrylate were <10 ppm in both cases.

| | before aftertreatment [ppm] | after aftertreatment [ppm] | after 7 days [ppm] |
|---|---|---|---|
| Vinyl acetate (Trig. C) | 600 | 30 | <10 Ex. 4 |
| Vinyl acetate (Trig. AW 70) | 600 | 80 | 80 V4 |

Example 5 and Comparative Example V5

10 kg of vinyl acetate/acrylate/®VeoVa dispersion having a viscosity of 200 mPa·s and a residual vinyl acetate content of 600 ppm were heated to a temperature of 60° C. In the aftertreatment, 34.2 g of a 50% strength emulsion of ®Trigonox 21 S (tert-butyl 2-ethylhexanoate, 0.17 part by weight, based on dispersion), prepared from 17.1 g of ®Trigonox 21S, 0.50 g of ®Hostapal BV (tri-tert-butylphenol EO sulfate, trade name of Clariant GmbH) and 16.6 g of water, or 24.4 g of ®Trigonox AW 70 (70% strength) (0.17 part by weight, based on dispersion) were added while stirring.

After 10 minutes, ®Brüggolit FF06 (342 g) (0.17 part by weight, based on dispersion) was added as a 5% strength aqueous solution. After a further 10 minutes, a 1% strength aqueous Mohr's salt solution (40 ml, 0.004 part by weight, based on dispersion) and 49 g of water were added.

TABLE 5

Amounts of residual monomers in the aqueous polymer dispersion before and after the aftertreatment according to the invention (example 5) in comparison with a hydroperoxide (®Trigonox AW 70, comparative example V5).

| | before aftertreatment [ppm] | after aftertreatment [ppm] | after 7 days [ppm] |
|---|---|---|---|
| Vinyl acetate (Trig. 21 S in emulsion) | 600 | 20 | <10 Ex. 5 |
| Vinyl acetate (Trig. AW 70) | 600 | 80 | 80 V5 |

In all examples, the aftertreatment was stopped after the end of the experiment (total time from the first addition of the oxidizing agent was 65 min) by means of a free radical scavenger (100 ml of a 1% strength hydroquinone monomethyl ether in methanol).

The invention claimed is:

1. A process for reducing the amount of residual monomers in aqueous polymer dispersions by chemical aftertreatment, comprising: treating an aqueous polymer dispersion containing residual monomers with a redox system which consists essentially of
   a) from 0.005 to 5% by weight based on the total weight of all monomers used for the preparation of the polymer dispersion, of at least one oxidizing agent based on an organic peroxide from the class consisting of the
      a1) a perester which is tert-butyl perbenzoate, tert-butyl peroxy-3,5,5-trimethylhexanoate, tert-butyl peroxy-2-ethylhexanoate, cumyl peroxyneodecanoate, 1,1,3,3-tetramethylbutyl peroxyneodecanoate, tert-butyl peroxyneodecanoate, 1,1,3,3-tetramethylbutyl peroxypivalate, tert-butyl peroxyneoheptanoate, tert-amyl peroxypivalate, tert-butyl peroxypivalate, 1,1,3,3-tetramethylbutylperoxy-2-ethylhexanoate, tert-amyl peroxy-2-ethylhexanoate, tert-butyl peroxydiethylacetate, tert-butyl peroxyisobutyrate, tert-butyl peroxyacetate or tert-amyl peroxybeuzoate, or
      a2) a percarbonate which is 1-(2-ethyihexanoylperoxy)-1,3-dimethylbutyl peroxypivalate, di(2-ethylhexyl) peroxydicarbonate, 2,5-dimethyl-2,5-di(2-ethylhexanoylperoxy)hexane, tert-amylperoxy 2-ethyihexyl carbonate, tert-butylperoxy isopropyl carbonate or tert-butylperoxy 2-ethylhexyl carbonate, or
      a3) a perketal which is 1,1-di(tert-butylperoxy)-3,3,5-trimethylcyclohexane, 2,2-di(4,4-di(tert-butylperoxy)cyclohexyl)propane, 1,1-di(tert-butylperoxy)

cyclohexane, 2,2-di(tert-butylperoxy)butane, 3,6,9-triethyl-1,4,7-triperoxynonane or 3,6,9-trimethyl-1,4,7-triperoxynonane, and
   b) from 0.005 to 5% by weight, based on the total weight of all monomers used for the preparation of the polymer dispersion, of at least one reducing agent from the group consisting of the sulfinic acids and the salts thereof having the structure

$$MO—SO—CR^{12}R^{13}R^{14} \quad (2)$$

in which M is hydrogen, $NH^4$, a monovalent metal ion or one equivalent of a divalent metal ion of the groups Ia, IIa, IIb, IVa or VIIIb of the Periodic Table of the Elements, in which $R^{12}$=OH, $NR^{15}R^{16}$, in which $R^{15}$ and $R^{16}$, independently of one another, are hydrogen or $C_1$-$C_6$-alkyl,
   in which $R^{13}$=hydrogen or an alkyl, alkenyl, cycloalkyl or aryl group, it being possible for these groups to have 1, 2 or 3 substituents which, independently of one another, are selected from $C_1$-$C_6$-alkyl, OH, O-$C_1$-$C_6$-alkyl, halogen and $CF_3$, in which $R^{14}$=COOM, $SO_3M$, $COR^{15}$, $CONR^{15}R^{16}$, $COOR^{15}$, in which M, $R^{15}$ and $R^{16}$ have the meanings stated above, or, if $R^{13}$ is aryl, this may be unsubstituted or substituted as stated above, $R^{14}$ is also H, and the salts thereof,
   and optionally sodium sulfite and/or sulfonic acid derivates which cannot eliminate any formaldehyde.

2. The process as claimed in claim 1, wherein the redox system further comprises catalytic amounts of a polyvalent metal ion which may occur in a plurality of valency states.

3. The process as claimed in claim 1, wherein 2-hydroxyphenylhydroxymethylsulfinic acid or the sodium salt thereof, 4-methoxyphenylhydroxymethysulfinic acid or the sodium salt thereof, 2-hydroxy-2-sulfinatoacetic acid or the disodium or zinc salt thereof or 2-hydroxy-2-suffinatopropionic acid or the disodium salt thereof is the reducing agent.

4. The process as claimed in claim 1, wherein the amount of oxidizing agent added is in the range of from 0.02 to 3% by weight, based on the total weight of all monomers, and wherein the amount of reducing agent added is in the range of from 0.02 to 3% by weight, likewise based on the total weight of all monomers.

5. The process as claimed in claim 1, wherein the reducing agent comprises a mixture of disodium 2-hydroxy-2-sulfinatoacetate in an amount in the range of from 50 to 60% by weight, sodium sulfite in an amount in the range of from 30 to 35% by weight and disodium 2-hydroxy-2-sulfonatoacetate in an amount in the range of from 10 to 15% by weight, based on the total weight of the mixture.

6. The process as claimed in claim 1, wherein the oxidizing agent and the reducing agent are fed insuccession in separate feeds as components for the aftertreatment of the polymer dispersion.

7. The process as claimed in claim 1, wherein at least one component is fed in by metering.

8. The process as claimed in claim 1, wherein at least one of the components is fed in portions.

9. The process as claimed in claim 1, wherein first the oxidizing agent and then the reducing agent are added.

10. The process as claimed in claim 1, wherein the reducing agent is fed in by metering.

11. The process as claimed in claim 2, wherein the metal ions for the aftertreatment of the polymer dispersion are added after the oxidizing agent and the reducing agent.

12. The process as claimed in claim 2, wherein the metal ions for the aftertreatment are added after the oxidizing agent and together with the reducing agent.

13. The process as claimed in claim 2, wherein the polyvalent metal ions used are iron ions.

14. The process as claimed in claim 1, wherein the temperature during the aftertreatment is in the range of from 20 to 100° C.

15. The process as claimed in claim 1, wherein the aftertreatment is carried out under a pressure in the range of <1 MPa.

16. The process as claimed in claim 1, wherein the aftertreatment is carried out at a pH in the range of from 2 to 9.

17. The process as claimed in claim 1, which is carried out using a polymer dispersion having a viscosity in the range of greater than or equal to 100 mPa·s.

18. The process as claimed in claim 1, which is carried out using a polymer dispersion which contains, as polymerizable monomers, esters of vinyl alcohol and monocarboxylic acids having from 1 to 18 carbon atoms.

19. The process as claimed in claim 1, which is carried out using a polymer dispersion which contains, as polymerizable monomers, esters of α,β-monoethyleniclly unsaturated mono- and dicarboxylic acids, alkanols having from 1 to 12 carbon atoms, or nitriles of α,β-monoethylenically unsaturated carboxylic acids.

20. The process as claimed in claim 1, which is carried out using a polymer dispersion which contains, as polymerizable monomers, aromatic or aliphatic α,β-unsaturated, unsubstituted or halogen-substituted hydrocarbons.

21. The process as claimed in claim 1, wherein said oxidizing agent is tert-butyl perbenzoate, tert-butyl peroxy-3,5,5-trimethylhexanoate or tert-butyl peroxy-2-ethylhexanoate.

22. The process as claimed in claim 1, wherein said oxidizing agent is tert-butyl perbenzoate.

23. The process as claimed in claim 1, wherein said oxidizing agent is tert-butyl perbeuzoate, tert-butyl peroxy-3,5,5-trimethylhexanoate and tert-butyl peroxy-2-ethylhexanoate, tert-butyl peroxyneoheptanoate, tert-amyl peroxypivalate, tert-butyl peroxypivalate, tert-amyl peroxy-2-ethylhexanoate, tert-butyl peroxydiethylacetate, tert-butyl peroxyisobutyrate, tert-butyl peroxyacetate or tert-amyl peroxybenzoate, or the a2) said percarbonate is tert-amylperoxy 2-ethyihexyl carbonate, tert-butylperoxy isopropyl carbonate or tert-butylperoxy 2-ethyihexyl carbonate, or the a3) said perketal is 1,1-di(tert-butylperoxy)-3,3,5-trimethylcyclohexane, 2,2-di(4,4-di(tert-butylperoxy)cyclohexyl)propane, 1,1-di(tert-butylperoxy)eyclohexane or 2,2-di(tert-butylperoxy)butane.

24. The process as claimed in claim 1, wherein said oxidizing agent is tert-butyl perbenzoate, tert-butyl peroxy-3,5,5-trimethylhexanoate and tert-butyl peroxy-2-ethylhexanoate, tert-butyl peroxyneoheptanoate, tert-hutyl peroxypivalate, tert-butyl peroxydiethylacetate, tert-butyl peroxyisobutyrate or tert-butyl peroxyacetate or a2) said percarbonate is tert-butylperoxy isopropyl carbonate or tert-butylperoxy 2-ethylhexyl carbonate, or a3) said perketal is 1,1-di(tert-butylperoxy)-3,3,5-trimethylcyclohexane, 2,2-di(4,4-di(tert-butylperoxy)cyclohexyl)propane, 1,1-di(tert-butylperoxy)cyclohexane, or 2,2-di(tert-butylperoxy)butane.

* * * * *

UNITED STATES PATENT AND TRADEMARK OFFICE
CERTIFICATE OF CORRECTION

PATENT NO. : 7,244,812 B2
APPLICATION NO. : 10/527178
DATED : July 17, 2007
INVENTOR(S) : Harmin Müller et al.

It is certified that error appears in the above-identified patent and that said Letters Patent is hereby corrected as shown below:

On the Title Page (57):

In the ABSTRACT, lines 2–3 please insert -- by -- after "dispersions" and before "means".

In the Claims:

In Claim 1, in column 15 and line 55 to line 56, "peroxybeu-zonate" should read -- peroxyben-zonate --.

in column 15 and line 61, "2-ethyihexyl" should read -- 2-ethylhexyl --.

In Claim 3, in column 16 and line 34 to line 35, "2-suffinatopro-pionic" should read -- 2-sulfinatopro-pionic --.

In Claim 6, in column 16 and line 51, "insuccession" should read -- in succession --.

UNITED STATES PATENT AND TRADEMARK OFFICE
CERTIFICATE OF CORRECTION

PATENT NO. : 7,244,812 B2
APPLICATION NO. : 10/527178
DATED : July 17, 2007
INVENTOR(S) : Harmin Müller et al.

It is certified that error appears in the above-identified patent and that said Letters Patent is hereby corrected as shown below:

In Claim 23, in column 18 and line 4, "perbeuzoate" should read -- perbenzoate --.

in column 18 and line 11, "2-ethyihexyl" should read -- 2-ethylhexyl --.

Signed and Sealed this

Eighteenth Day of December, 2007

JON W. DUDAS
*Director of the United States Patent and Trademark Office*